(12) United States Patent
Wong

(10) Patent No.: US 10,367,405 B2
(45) Date of Patent: Jul. 30, 2019

(54) VERTICALLY MOUNTED AND MAGNETICALLY DRIVEN POWER GENERATION APPARATUS WITH WEIGHT-FREE AND ENERGY-SAVING EFFECT

(71) Applicant: Shou-Cheng Wong, Kaohsiung (TW)

(72) Inventor: Shou-Cheng Wong, Kaohsiung (TW)

(*) Notice: Subject to any disclaimer, the term of this patent is extended or adjusted under 35 U.S.C. 154(b) by 320 days.

(21) Appl. No.: 15/606,409

(22) Filed: May 26, 2017

(65) Prior Publication Data

US 2018/0115233 A1    Apr. 26, 2018

(30) Foreign Application Priority Data

Oct. 20, 2016  (TW) .............................. 105133923 A

(51) Int. Cl.
*H02K 47/00*    (2006.01)
*F16C 32/04*    (2006.01)
(Continued)

(52) U.S. Cl.
CPC ......... *H02K 47/00* (2013.01); *F16C 32/0408* (2013.01); *F16C 32/0412* (2013.01);
(Continued)

(58) Field of Classification Search
CPC ........ H02K 47/00; H02K 47/04; H02K 47/14; H02K 47/20; H02K 7/09; H02K 7/02;
(Continued)

(56) References Cited

U.S. PATENT DOCUMENTS 4,320,927 A * 3/1982 Sertich ..................... A61C 1/05
310/90.5
4,340,260 A * 7/1982 Forster ................ F16C 32/0429
310/90.5
(Continued)

FOREIGN PATENT DOCUMENTS

CN    103270677    8/2013
CN    104806444    5/2015
(Continued)

OTHER PUBLICATIONS

English Abstracts for TW201310871, CN1104806444, CN103270677, TWM372395, and TW201347392, Total of 3 Pages.
(Continued)

*Primary Examiner* — Jeremy A Luks
(74) *Attorney, Agent, or Firm* — Lynette Wylie; Apex Juris, PLLC.

(57) ABSTRACT

A vertically mounted and magnetically driven power generation apparatus has multiple shelves vertically arranged and spaced apart. Each shelf has a through hole tapering downwards. A spindle is mounted through the multiple through holes. A motor driving the spindle and a primary power generator driven by the spindle and located below the motor are mounted around the spindle. Because of the weight of the primary power generator, adding additional weight is not need. A magnetic driven member is mounted around the spindle and located within a corresponding through hole. Multiple magnetic drive assemblies are mounted on inner walls of the multiple through holes. Each magnetic driven member is subject to forces of magnetic repulsion caused by first and second magnetic drive members of a corresponding magnetic drive assembly for the spindle to be rotated under a friction-free condition to enhance torque and rotation speed of the spindle.

16 Claims, 12 Drawing Sheets

(51) Int. Cl.
*H02K 7/09* (2006.01)
*F16C 33/14* (2006.01)

(52) U.S. Cl.
CPC .......... *F16C 32/0436* (2013.01); *F16C 33/14* (2013.01); *H02K 7/09* (2013.01)

(58) Field of Classification Search
CPC .............. F16C 32/0408; F16C 32/0412; F16C 32/0436; F16C 32/0429; F16C 32/0491
USPC ................................... 310/74, 90.5, 112–113
See application file for complete search history.

(56) References Cited

U.S. PATENT DOCUMENTS

| | | | | |
|---|---|---|---|---|
| 4,688,998 | A * | 8/1987 | Olsen | F04D 1/006 |
| | | | | 415/900 |
| 4,956,571 | A * | 9/1990 | Gordon | F16C 32/0438 |
| | | | | 310/10 |
| 5,010,722 | A * | 4/1991 | Yamaguchi | D01H 7/56 |
| | | | | 57/124 |
| 5,321,329 | A * | 6/1994 | Hovorka | F16C 39/063 |
| | | | | 310/90.5 |
| 5,831,362 | A | 11/1998 | Chu et al. | |
| 6,015,272 | A * | 1/2000 | Antaki | F04D 3/02 |
| | | | | 415/900 |
| 6,124,658 | A * | 9/2000 | Coenen | D01H 4/12 |
| | | | | 310/90 |
| 6,359,357 | B1 * | 3/2002 | Blumenstock | F16C 32/0465 |
| | | | | 310/90.5 |
| 7,462,950 | B2 * | 12/2008 | Hu | F16C 39/066 |
| | | | | 290/44 |
| 8,053,940 | B2 * | 11/2011 | McCulley | H02K 53/00 |
| | | | | 310/113 |
| 10,305,348 | B2 * | 5/2019 | Wong | H02K 7/09 |
| 2001/0036565 | A1 * | 11/2001 | Jennings | F16C 32/0493 |
| | | | | 429/10 |
| 2003/0197439 | A1 * | 10/2003 | Kuipers | F16C 39/063 |
| | | | | 310/90.5 |
| 2005/0264118 | A1 * | 12/2005 | Kascak | F16C 32/0493 |
| | | | | 310/90.5 |
| 2012/0187922 | A1 * | 7/2012 | Dubois | F16F 15/305 |
| | | | | 322/4 |
| 2018/0069452 | A1 * | 3/2018 | Wong | H02K 1/2793 |
| 2018/0115233 | A1 * | 4/2018 | Wong | F16C 32/0408 |
| 2018/0351446 | A1 * | 12/2018 | Wong | H02K 53/00 |

FOREIGN PATENT DOCUMENTS

| | | |
|---|---|---|
| TW | M372395 | 1/2010 |
| TW | 201310871 | 3/2013 |
| TW | 201347392 | 11/2013 |

OTHER PUBLICATIONS

Non-English Search and Examination Report for TW105133923, Total of 2 Pages.

\* cited by examiner

VERTICALLY MOUNTED AND MAGNETICALLY DRIVEN POWER GENERATION APPARATUS WITH WEIGHT-FREE AND ENERGY-SAVING EFFECT

BACKGROUND OF THE INVENTION

1. Field of the Invention

The present invention relates to an energy-saving power generation apparatus and, more particularly, to a vertically mounted and magnetically driven power generation apparatus with weight-free and energy-saving effect.

2. Description of the Related Art

A conventional transmission assembly includes a transmission mechanism and a shaft support for the transmission mechanism to be rotatably mounted through the shaft support. To reduce friction between the shaft support and the transmission mechanism, a bearing is mounted between the shaft support and the transmission mechanism with bearing lubricant added therein for lubrication. Despite the bearing and the bearing lubricant, the issues of friction and energy loss among parts of the transmission assembly still exist. As a result, in the case of a rotational power source and a rotational power receiving end connected with the transmission assembly, energy fails to be effectively utilized.

Moreover, as the foregoing transmission assembly is a critical assembly in the conventional power generation apparatus, when kinematic energy provided by a rotational power source is transmitted to a power-generating assembly of a power generation apparatus, the kinematic energy is consumed because of friction among parts in the transmission assembly and the direct impact is that the kinematic energy fails to be effectively converted into electrical energy, and this explains why the conventional power generation apparatus is known to have the issue of unsatisfactory power-generating performance.

SUMMARY OF THE INVENTION

An objective of the present invention is to provide a vertically mounted and magnetically driven power generation apparatus with weight-free and energy-saving effect, targeting at resolving the issue of energy loss and ineffective power generation performance caused by transmission mechanism of the conventional power generation apparatus.

To achieve the foregoing objective, the vertically mounted and magnetically driven power generation apparatus with weight-free and energy-saving effect includes a magnetically driven transmission assembly, a primary power generator and a motor.

The magnetically driven transmission assembly has a support frame, a transmission mechanism and multiple drive assemblies.

The support frame has multiple shelves, multiple struts and a center axis.

The multiple shelves are vertically arranged and are vertically spaced apart from each other. Each shelf has a through hole formed through the shelf and tapering downwards.

The multiple struts are securely connected with the multiple shelves.

The center axis vertically and centrally passes through the support frame and the through holes of the multiple shelves.

The transmission mechanism has a spindle and multiple magnetic driven members.

The spindle is vertically mounted through the support frame along the center axis.

The multiple magnetic driven members are securely mounted around the spindle and are located within the through holes of the respective shelves. Each magnetic driven member is a permanent magnet and has an upper driven portion, a lower driven portion and a ridge line.

The upper driven portion is a truncated cone tapering upwards. A top of the upper driven portion extends beyond a top surface of a corresponding shelf through a top opening of the through hole of the corresponding shelf.

The lower driven portion with a top connected with a bottom of the upper driven portion is a truncated cone tapering downwards, has a shape symmetrical to that of the upper driven portion, has a magnetic pole different from that of the upper driven portion, and is mounted inside the through hole of the corresponding shelf.

The ridge line is formed on a junction between the upper driven portion and the lower driven portion and takes the form of a circle.

The multiple magnetic drive assemblies are mounted on inner walls of the through holes of the respective shelves. Each magnetic drive assembly has a first magnetic drive member and a second magnetic drive member.

The first magnetic drive member is mounted on the inner wall of the through hole of a corresponding shelf.

The second magnetic drive member with a top connected with a bottom of the first magnetic drive member is mounted on the inner wall of the through hole of the corresponding shelf. The first magnetic drive member and the second magnetic drive member are adjacent to but have no contact with the lower driven portion of a corresponding magnetic driven member by way of mutual magnetic repulsion for the transmission mechanism to be vertically and suspendedly mounted through the support frame and the multiple magnetic drive assemblies.

The primary power generator is located at a lower portion of the support frame of the magnetically driven transmission assembly and has an upper rotating member, multiple upper permanent magnets, a lower rotating member, multiple lower permanent magnets, at least one fixing board, and multiple windings.

The upper rotating member is securely mounted around the spindle.

The multiple upper permanent magnets are mounted on a bottom surface of the upper rotating member and are distributed in rows aligned in multiple radial directions on the upper rotating member. Bottom surfaces of the multiple upper permanent magnets are flush with the bottom surface of the upper rotating member.

The lower rotating member is securely mounted around the spindle and is vertically spaced apart from the upper rotating member.

The multiple lower permanent magnets are mounted on a top surface of the lower rotating member and are distributed in rows aligned in multiple radial directions on the lower rotating member. Top surfaces of the multiple lower permanent magnets are flush with the top surface of the lower rotating member.

The at least one fixing board is securely mounted to the multiple struts, is located between the upper rotating member and the lower rotating member, and has multiple slots formed through the at least one fixing board, aligned radially, and progressively increasing in diameter in a radial direction from a center to a rim of the upper rotating member.

The multiple windings are mounted inside the multiple slots of the at least one fixing board.

The motor is mounted above and separated from the primary power generator and has a stator and a rotor.

The stator is securely mounted to the multiple struts.

The rotor is mounted around the spindle and is located within the stator.

According to the structure of the power generation apparatus, by virtue of forces of magnetic repulsion between the transmission mechanism and the multiple drive assemblies, the transmission mechanism can be stably, vertically and rotatably mounted through the support frame for the spindle to be rotated around the center axis through the support frame. While the spindle is driven and rotated by the motor, the primary power generator securely mounted around a lower portion of the spindle is rotated to convert rotational kinematic energy into electrical energy. The motor stops outputting rotational kinematic energy until the spindle and the primary power generator are rotated at a specific rotational speed. Meanwhile, the transmission mechanism and the primary power generator mounted to a bottom end of the transmission mechanism can be still rotated by rotational inertia. Because there is no friction upon rotation of the spindle, the torque and rotation speed of the spindle can be enhanced during the course of rotation.

In view of the effect of magnetic repulsion between the transmission mechanism and the multiple magnetic drive assemblies, there is no frictional resistance when the spindle is rotated, such that energy loss can be reduced under the friction-free condition. Additionally, the primary power generator mounted to a lower end of the spindle and rotated along with the spindle allows the power generation apparatus to achieve the objective of energy-saving power generation.

Other objectives, advantages and novel features of the invention will become more apparent from the following detailed description when taken in conjunction with the accompanying drawings.

DETAILED DESCRIPTION OF THE INVENTION

Figure 1:
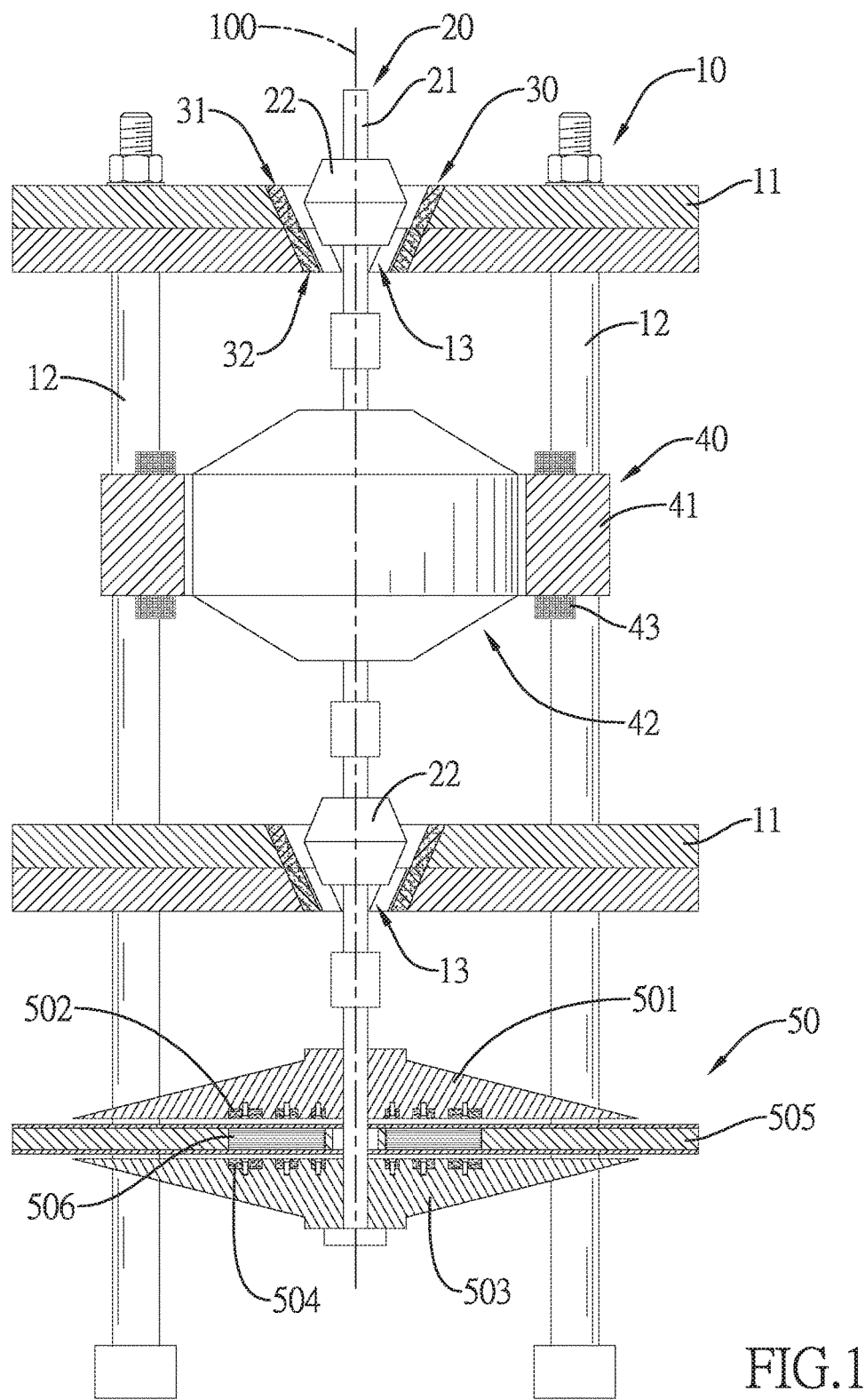
FIG. 1 is a cross-sectional view of an embodiment of a power generation apparatus in accordance with the present invention.

With reference to FIG. 1, an embodiment of a power generation apparatus in accordance with the present invention includes a vertically mounted and magnetically driven transmission assembly, a motor 40 and a primary power generator 50. The vertically mounted and magnetically driven transmission assembly has a support frame 10, a transmission mechanism 20 and multiple magnetic drive assemblies 30. The motor 40 and the primary power generator 50 may be mounted inside a housing.

Figure 2:
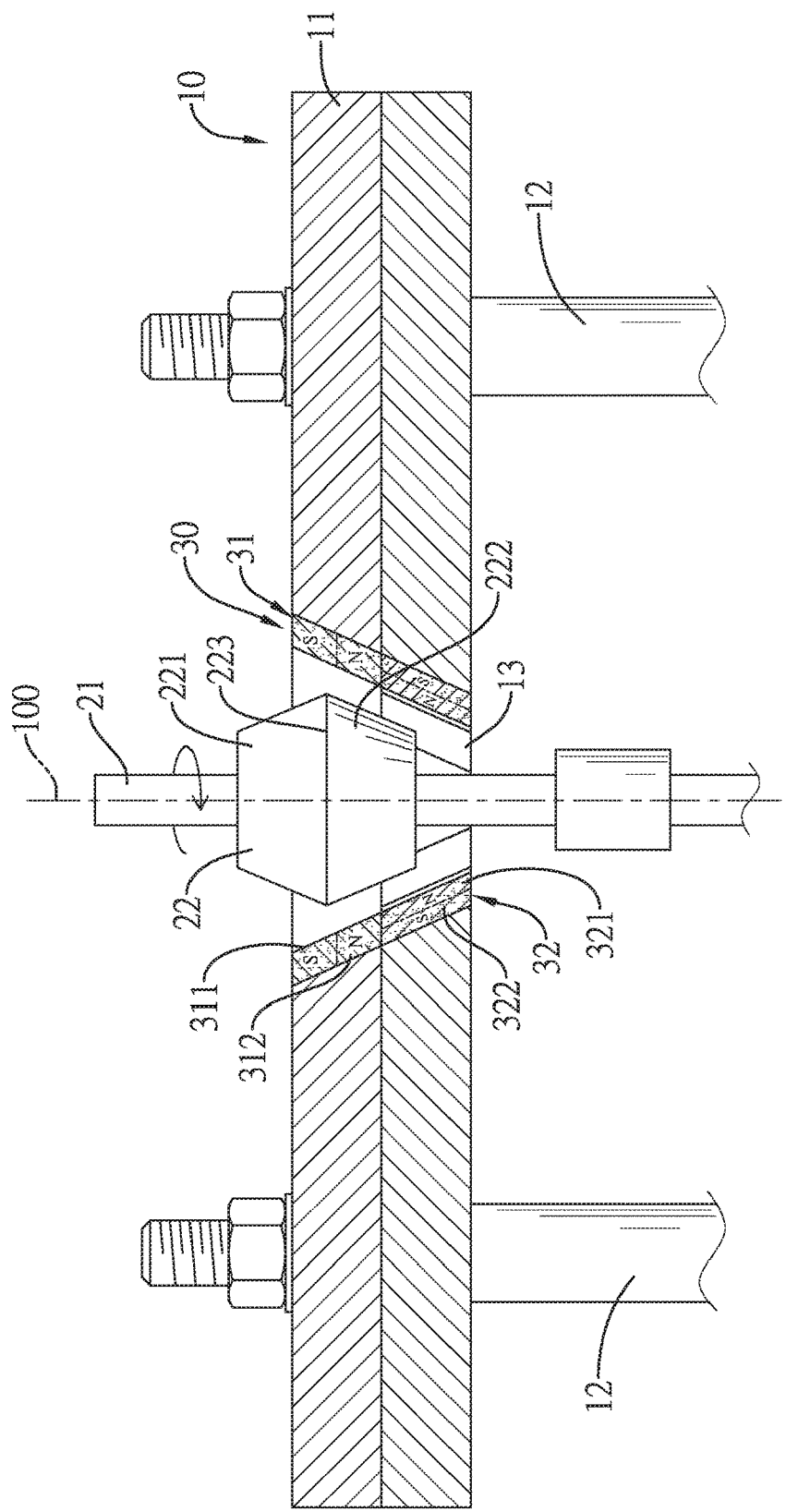
FIG. 2 is an enlarged cross-sectional view of a support frame, a transmission mechanism and a magnetic drive assembly of the power generation apparatus in FIG. 1.

With reference to FIGS. 1 and 2, the support frame 10 includes multiple shelves 11 and multiple struts 12. The multiple shelves 11 are vertically arranged and are vertically spaced apart from each other. The multiple struts 12 are securely connected with the multiple shelves 11 to support the multiple shelves 11. Each shelf 11 may be formed by a single board or multiple boards stacked to each other. The support frame 10 has a center axis 100 vertically and centrally passing through the support frame 10. Each shelf 11 has a through hole 13 that is formed through the shelf 11 and tapers downwards and may be a truncated conic via hole or a truncated pyramid-like via hole.

With reference to FIGS. 1 and 2, the transmission mechanism 20 includes a spindle 21 and multiple magnetic driven members 22. The spindle 21 may take the form of a single shaft or multiple shafts sequentially connected to each other, and is vertically mounted through the support frame 10 along the center axis 100. The multiple magnetic driven members 22 are securely mounted around the spindle 21 and are located within the through holes 13 of the respective shelves 11. In other words, each magnetic driven member 22 corresponds to the through hole 13 of a respective one of the multiple shelves 11.

With further reference to FIG. 1, there are two magnetic driven members 22, and one of the magnetic driven members 22, the motor 40, the other magnetic driven member 22 and the primary power generator 50 are sequentially mounted around the spindle 21 in a downward direction. It is noted that a radial width of the primary power generator 50 is greater than that of the motor 40. The number of the magnetic driven members 22 may be a number other than two as illustrated in FIG. 1. The magnetic driven members 22 may be permanent magnets. With further reference to FIG. 2, each magnetic driven member 22 has an upper driven portion 221 and a lower driven portion 222. A top of the lower driven portion 222 is connected with a bottom of the upper driven portion 221. The lower driven portion 222 may be a truncated cone or a truncated pyramid tapering downwards. The upper driven portion 221 may be a truncated cone or a truncated pyramid tapering upwards. The shapes of the upper driven portion 221 and the lower driven portion 222 are symmetrical. A ridge line 223 is formed on a junction between the upper driven portion 221 and the lower driven portion 222 and takes the form of a circle or all sides of a regular polygon. Given the upper driven portion 221 and the lower driven portion 222 taking the form of a cone and the ridge line 223 taking the form of a circular line as an example, the diameter of the magnetic driven member 22 is largest at the ridge line 223 and the diameters of the magnetic driven member 22 at a truncated top surface and at a truncated bottom surface are equal and are smaller than the diameter at the ridge line 223. The upper driven portion 221 and the lower driven portion 222 have different magnetic poles. For example, when the upper driven portion 221 has the magnetic south pole S, the lower driven portion 222 has the magnetic north pole N. The lower driven portion 222 of each magnetic driven member 22 is mounted inside the through hole 13 of a corresponding shelf 11, and a top of the upper driven portion 221 of the magnetic driven member 22 extends beyond a top surface of the corresponding shelf 11 through a top opening of the through hole 13.

An included angle between the center axis 100 and each of a peripheral surface of the lower driven portion 222 and a peripheral surface of the upper driven portion 221 is in a range of 15° to 75°. Preferably, the included angle associated with each of the upper driven portion 221 and the lower driven portion 222 is 30°, 45° or 60°.

Figure 3:
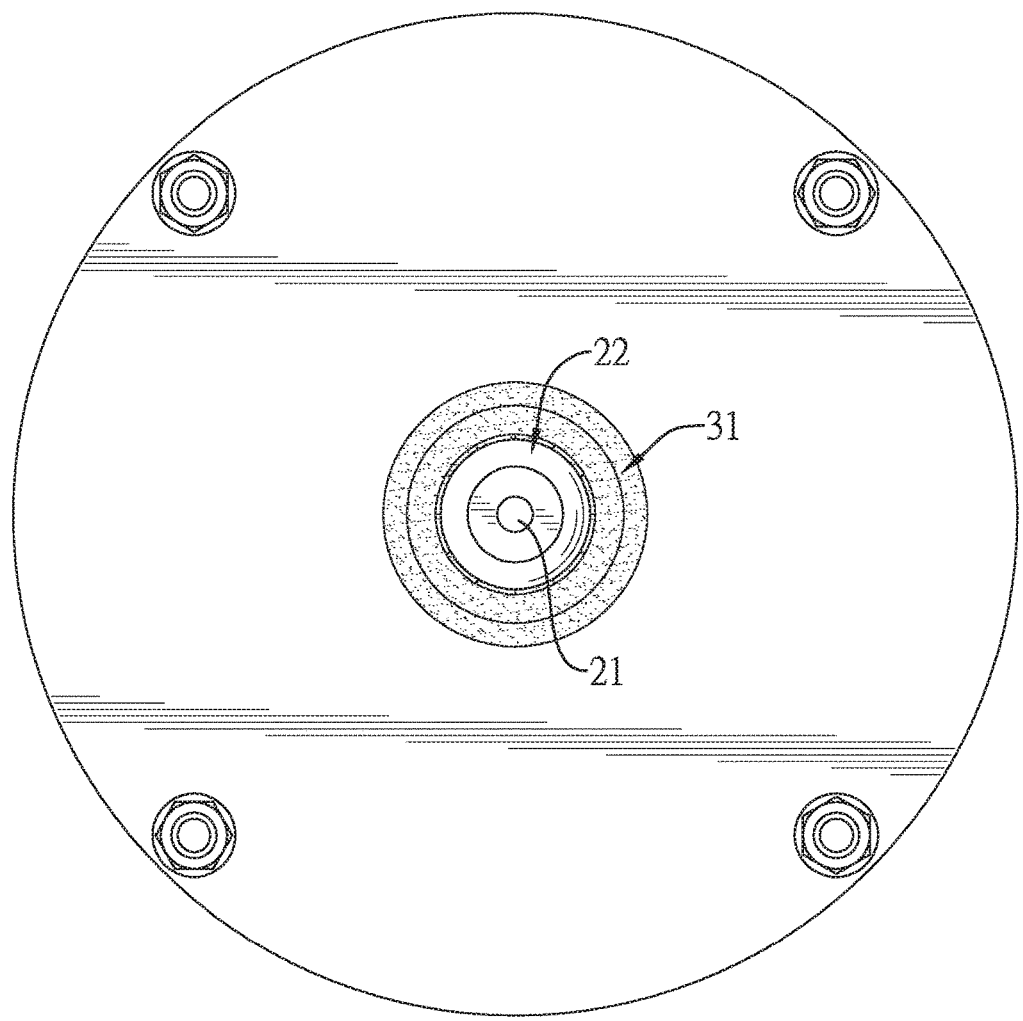
FIG. 3 is a top view of the power generation apparatus in FIG. 1.

With reference to FIGS. 1 to 3, the multiple magnetic drive assemblies 30 are mounted on inner walls of the through holes 13 of the respective shelves 11. The number of the multiple magnetic drive assemblies 30 corresponds to that of the multiple magnetic driven members 22. Each magnetic drive assembly 30 includes a first magnetic drive member 31 and a second magnetic drive member 32 mounted on the inner wall of the through hole 13 of a corresponding shelf 11 with a bottom of the first magnetic drive member 31 connected with a top of the second magnetic drive member 32. In other words, the first magnetic drive member 31 is located in an upper portion of the through hole 13, and the second magnetic drive member 32 is located in a lower portion of the through hole 13. The first magnetic drive member 31 and the second magnetic drive member 32 are adjacent to but have no contact with the lower driven portion 222 of a corresponding magnetic driven member 22 by way of mutual magnetic repulsion. Inner walls of the first magnetic drive member 31 and the second magnetic drive member 32 facing the lower driven portion 222 of the corresponding magnetic driven member 22 are parallel to the peripheral surface of the lower driven portion 222. A gap exists between the lower driven portion 222 and each of the first magnetic drive member 31 and the second magnetic drive member 32 of a corresponding magnetic drive assembly 30. The weight of the transmission mechanism 20 is offset by the magnetic repulsion occurring between the multiple magnetic drive assemblies 30 and the multiple magnetic driven members 22 on the transmission mechanism 20, such that the transmission mechanism 20 can be vertically and suspendedly mounted through the support frame 10 and the transmission mechanism 20 is rotatable around the center axis 100. By virtue of the first magnetic drive member 31 and the second magnetic drive member 32 of each magnetic drive assembly 30 taking the form of a conic ring or a truncated pyramid shell and a force of magnetic attraction generated between the first magnetic drive member 31 and a corresponding magnetic driven member 22 and a force of magnetic repulsion respectively generated between the second magnetic drive member 32 and the corresponding magnetic driven member 22, the transmission mechanism 20 can be vertically and stably rotated around the center axis 100.

Figure 4:
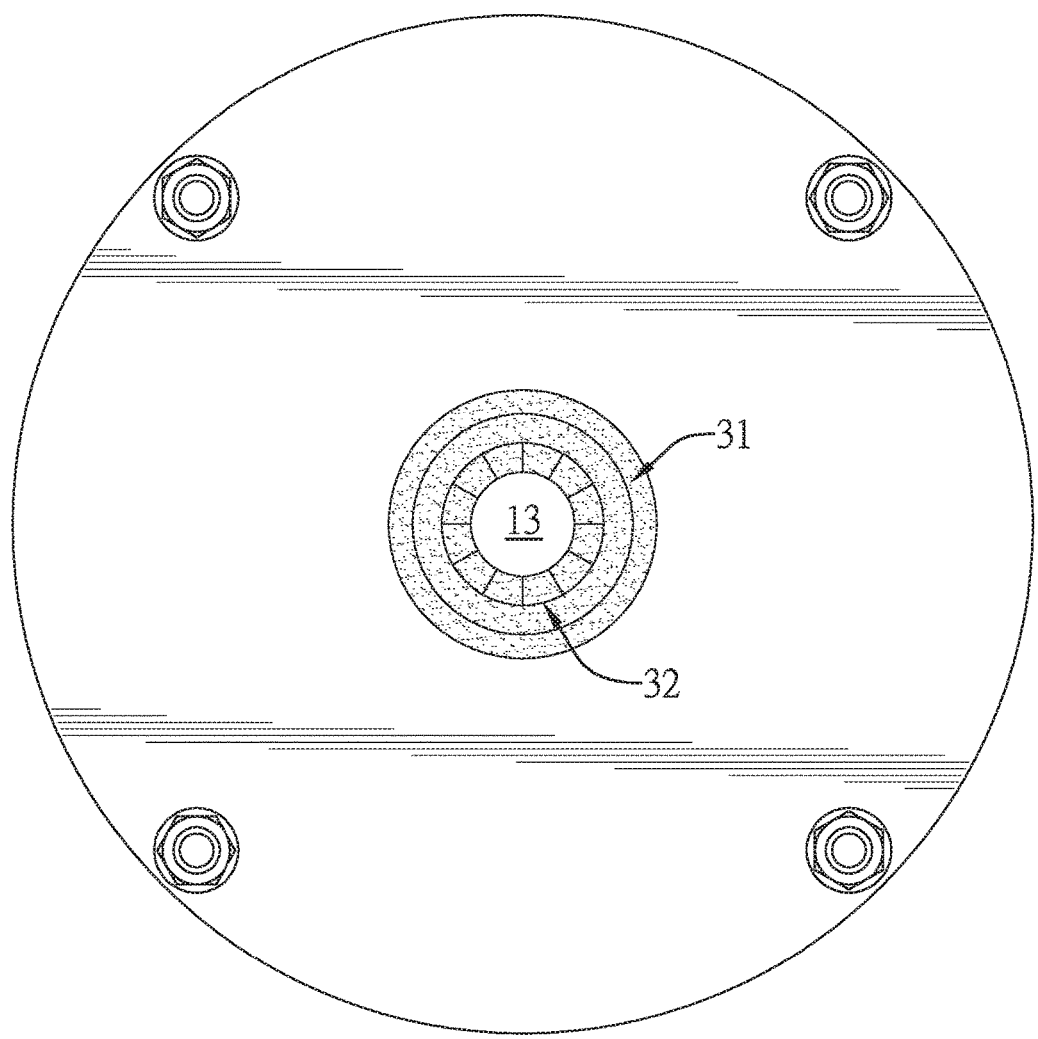
FIG. 4 is a bottom view of the power generation apparatus in FIG. 1.

With reference to FIGS. 2 to 4, each first magnetic drive member 31 may be a permanent magnet taking the form of a conic ring. The inner wall of the first magnetic drive member 31 facing a corresponding magnetic driven member 22 is parallel to the peripheral surface of the lower driven portion 222 of the corresponding magnetic driven member 22. An outer periphery of the first magnetic drive member 31 is mounted on an upper portion of the inner wall of a corresponding through hole 13. An included angle between the inner wall of the first magnetic drive member 31 facing the corresponding magnetic driven member 22 and the center axis 100 is in a range of 15° to 75°, and 30°, 45° or 60° is preferable.

With reference to FIG. 2, each first magnetic drive member 31 includes an upper pole portion 311 and a lower pole portion 312. The upper pole portion 311 and the lower pole portion 312 are integrally formed and annularly mounted on the inner wall of the through hole 13 to face a corresponding magnetic driven member 22. The upper pole portion 311 and the lower pole portion 312 are spaced apart from the corresponding magnetic driven member 22 by a gap and have different magnetic poles. The lower pole portion 312 and the lower driven portion 222 of the corresponding magnetic driven member 22 have identical magnetic poles. Thus, the upper pole portion 311 and the lower pole portion 312 provide a force of magnetic attraction and a force of magnetic repulsion. In other words, when the upper driven portion 221 and the lower driven portion 222 of the corresponding magnetic driven member 22 are the magnetic south pole S and the magnetic north pole N respectively, the upper pole portion 311 and the lower pole portion 312 are the magnetic south pole S and the magnetic north pole N respectively.

With reference to FIGS. 1 to 4, each second magnetic drive member 32 has multiple elongated permanent magnet plates annularly mounted on the inner wall of the through hole 13 of a corresponding shelf 11. Two edges of each adjacent two of the multiple elongated permanent magnet plates adjoin each other. The multiple elongated permanent magnet plates are arranged in the form of a truncated pyramid shell, and each elongated permanent magnet plate has an inner surface facing a corresponding magnetic driven member 22. The inner surfaces of the multiple elongated permanent magnet plates facing the corresponding magnetic driven member 22 are parallel to the peripheral surface of the lower driven portion 222 of the corresponding magnetic driven member 22. An included angle between the surface of each elongated permanent magnet plate and the center axis 100 is in a range of 15° to 75° and is 30°, 45° or 60° preferably.

With further reference to FIG. 2, each elongated permanent magnet plate of the second magnetic drive member 32 has an inner pole portion 321 proximate to the center axis 100 and an outer pole portion 322 distal to the center axis 100. The inner pole portion 321 and the outer pole portion 322 are spaced apart from the lower driven portion 222 of a corresponding magnetic driven member 22 by a gap. The inner pole portion 321 and the lower driven portion 222 of the corresponding magnetic driven member 22 have an identical magnetic pole, such that a force of magnetic repulsion is provided to the lower driven portion 222 of the corresponding magnetic driven member 22. Supposing that the upper driven portion 221 and the lower driven portion 222 of the corresponding magnetic driven member 22 are the magnetic south pole S and the magnetic north pole N respectively and the upper pole portion 311 and the lower pole portion 312 of the first magnetic drive member 31 have the magnetic south pole S and the magnetic north pole N respectively, the inner pole portion 321 and the outer pole portion 322 have the magnetic north pole N and the magnetic south pole S.

With further reference to FIG. 2, the ridge line 223 of each magnetic driven member 22 is aligned with a junction between the upper pole portion 311 and the lower pole portion 312 of a corresponding first magnetic drive member 31, and a bottom of the lower driven portion 222 of each magnetic driven member 22 is aligned with a central portion of the second magnetic drive member 32.

With further reference to FIG. 1, the motor 40 and the primary power generator 50 are separately mounted. The primary power generator 50 is capable of converting rotational kinematic energy into electrical energy. As being located under the motor 40 and at a lower portion of the support frame 10 and having a specific weight, the primary power generator 50 has the effect as a weight. By mounting the primary power generator 50 at the lower portion of the support frame 10, there is no need for additionally providing a weight.

Figure 5:
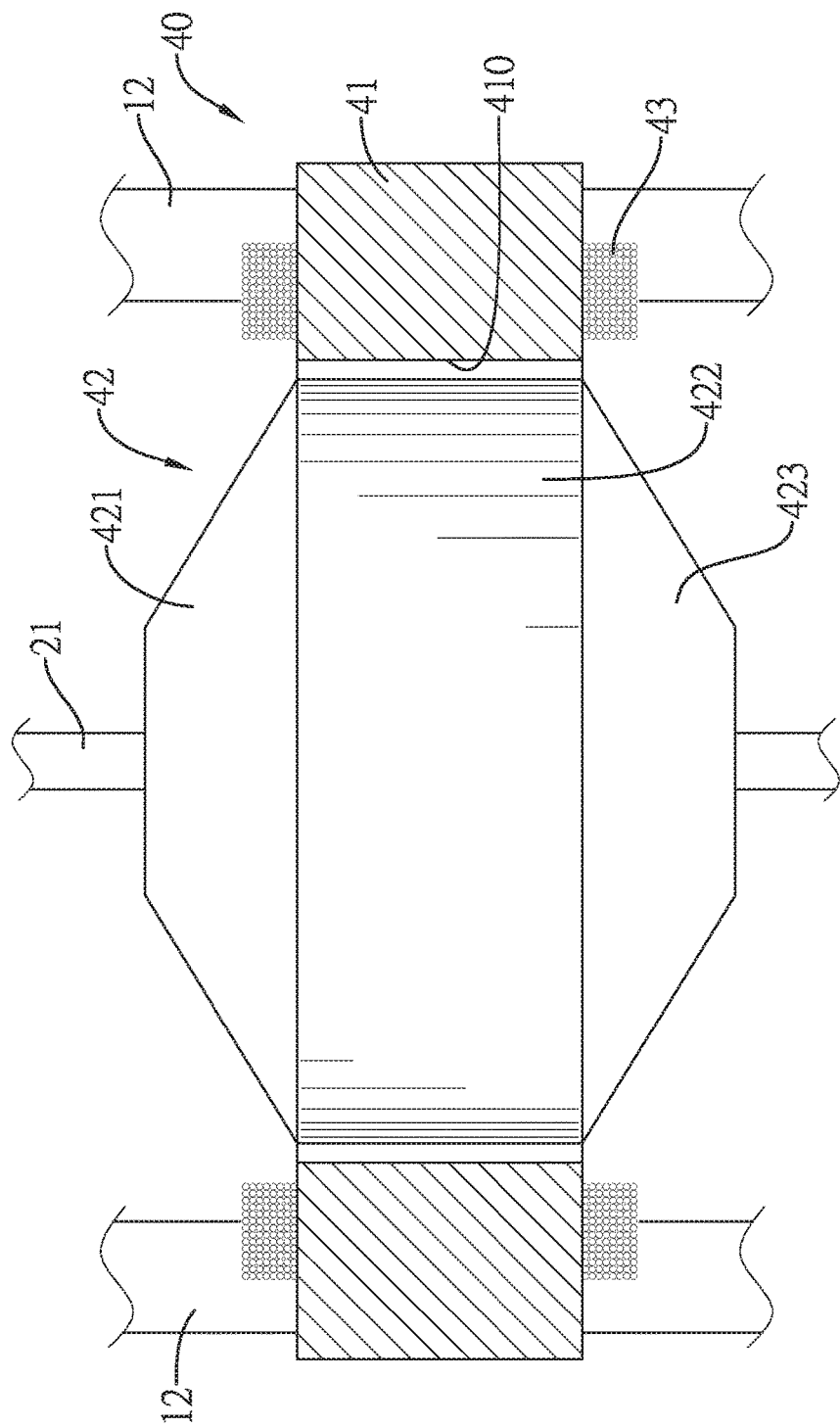
FIG. 5 is an enlarged cross-sectional view of a motor of the power generation apparatus in FIG. 1.
Figure 6:
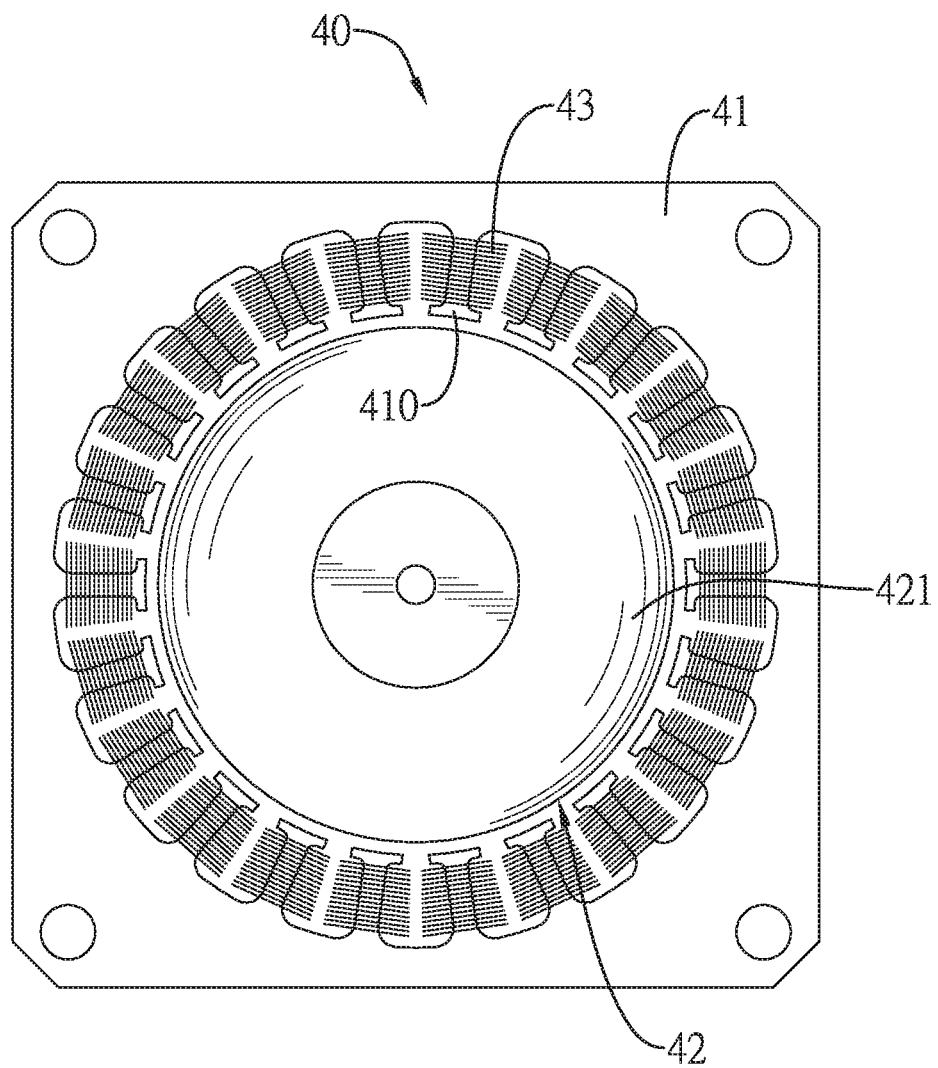
FIG. 6 is a bottom view of the motor in FIG. 5.

With reference to FIGS. 5 and 6, the motor 40 has a stator 41 and a rotor 42. The stator 41 is securely mounted to the multiple struts 12 and has multiple posts 410 annularly formed on an inner wall of the stator 41 and spaced apart from each other by a gap. A winding is mounted around each post 410. The rotor 42 may be made of aluminum or iron, is mounted around the spindle 21, is located within the stator 41, and is rotated along with the spindle 21. A circumferential edge of the rotor 42 is spaced apart from the multiple posts 410 by a gap. The rotor 42 has a top block 421, a middle block 422 and a bottom block 423 integrally formed as a whole. The middle block 422 may be a cylindrical block. The top block 421 is formed on a top surface of the middle block 422 and tapers upwards. The bottom block 423 is formed on a bottom surface of the middle block 422 and tapers downwards. The diameters of a bottom surface of the top block 421, a top surface of the bottom block 423, and the middle block 422 are equal.

Figure 7:
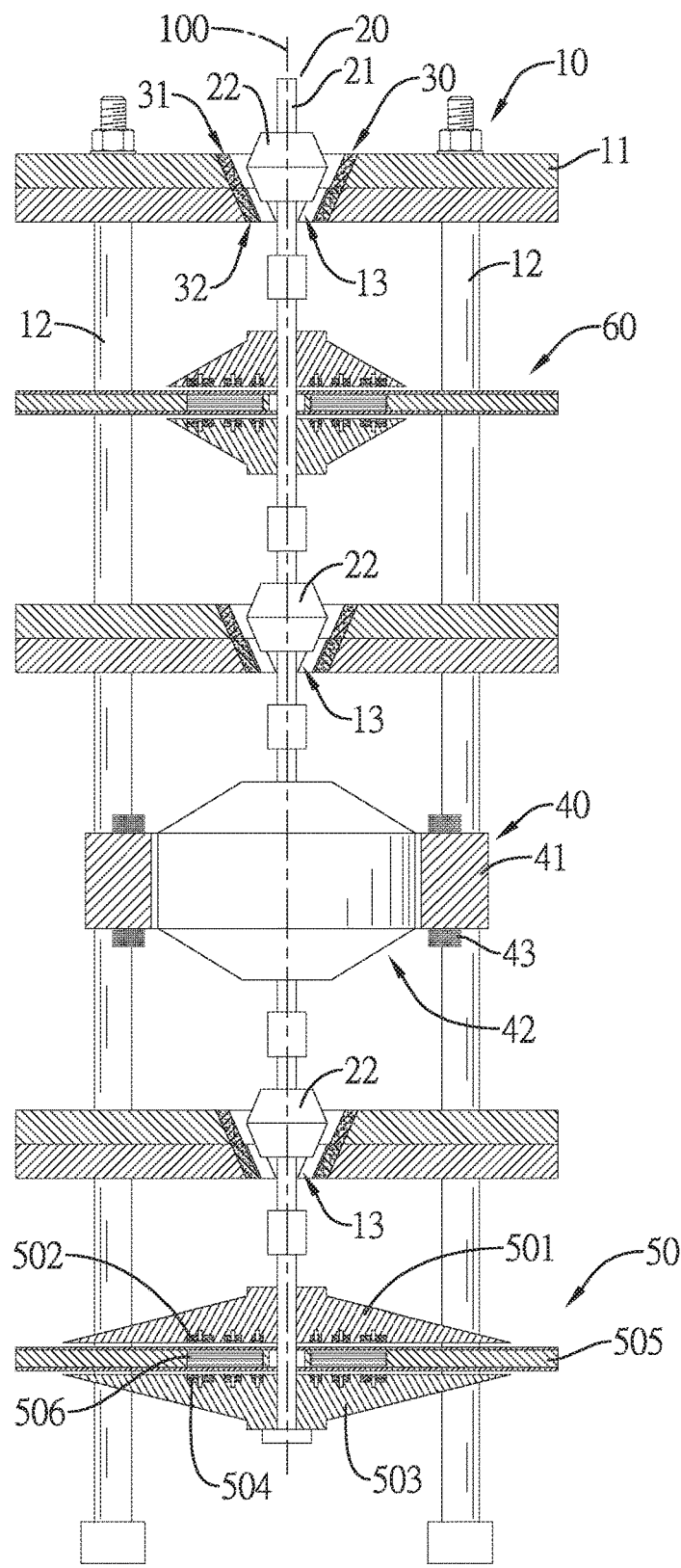
FIG. 7 is a cross-sectional view of another embodiment of a power generation apparatus in accordance with the present invention.
Figure 8:
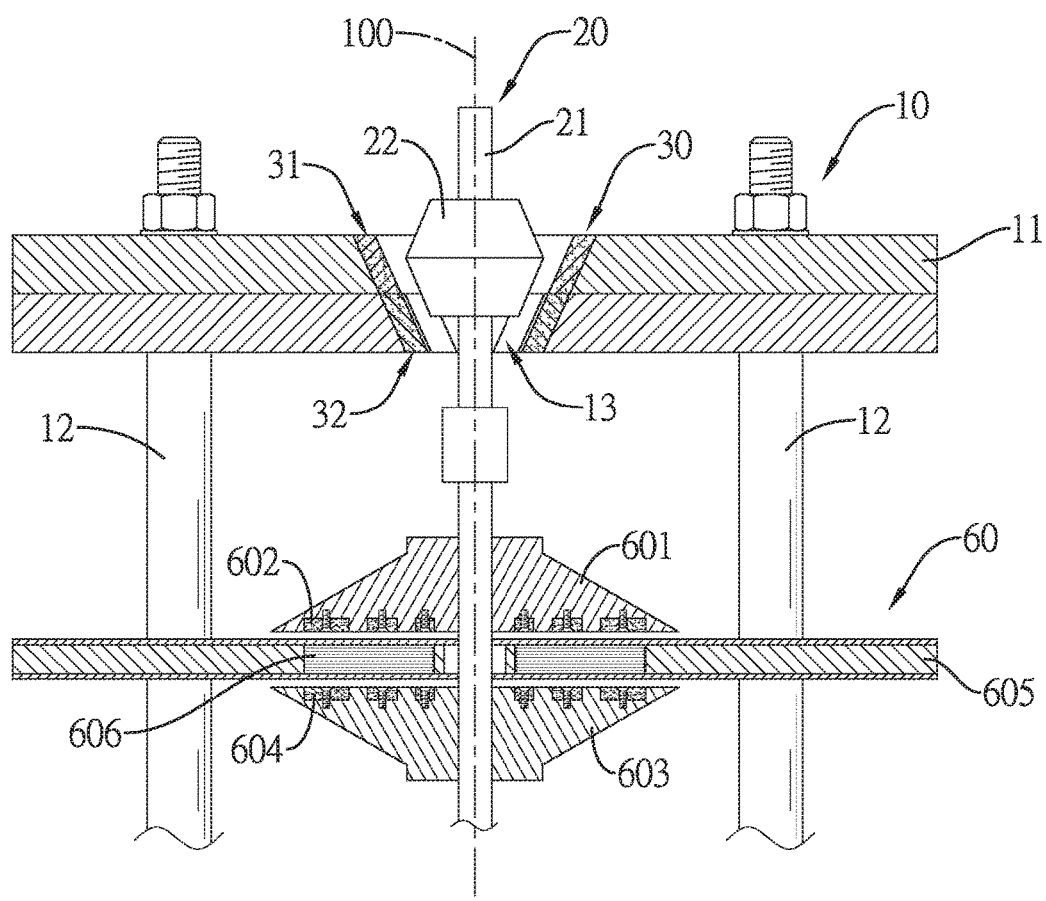
FIG. 8 is a partially enlarged cross-sectional view of the power generation apparatus in FIG. 7.

With reference to FIGS. 7 and 8, another embodiment of a power generation apparatus in accordance with the present invention differs from the foregoing embodiment in that the present embodiment includes an additional auxiliary power generator 60 mounted above the motor 40 and one additional magnetic driven member is mounted above the auxiliary power generator 60. In other words, the present embodiment provides a magnetic driven member 22, the auxiliary power generator 60, another magnetic driven member 22, the motor 40, yet another magnetic driven member 22, and the primary power generator 50 mounted along the spindle 21 in a downward direction. The radial width of the motor 40 is greater than that of the auxiliary power generator 60. As can be seen from FIG. 7, the primary power generator 50 has the greatest radial width among the auxiliary power generator 60, the motor 40 and the primary power generator 50. Besides, the primary power generator 50 is the heaviest one among the auxiliary power generator 60, the motor 40 and the primary power generator 50. The primary power generator 50 can be taken as a weight by placing the primary power generator 50 at a lower portion of the support frame 10. Thus, there is no need for providing an additional weight.

Figure 9:
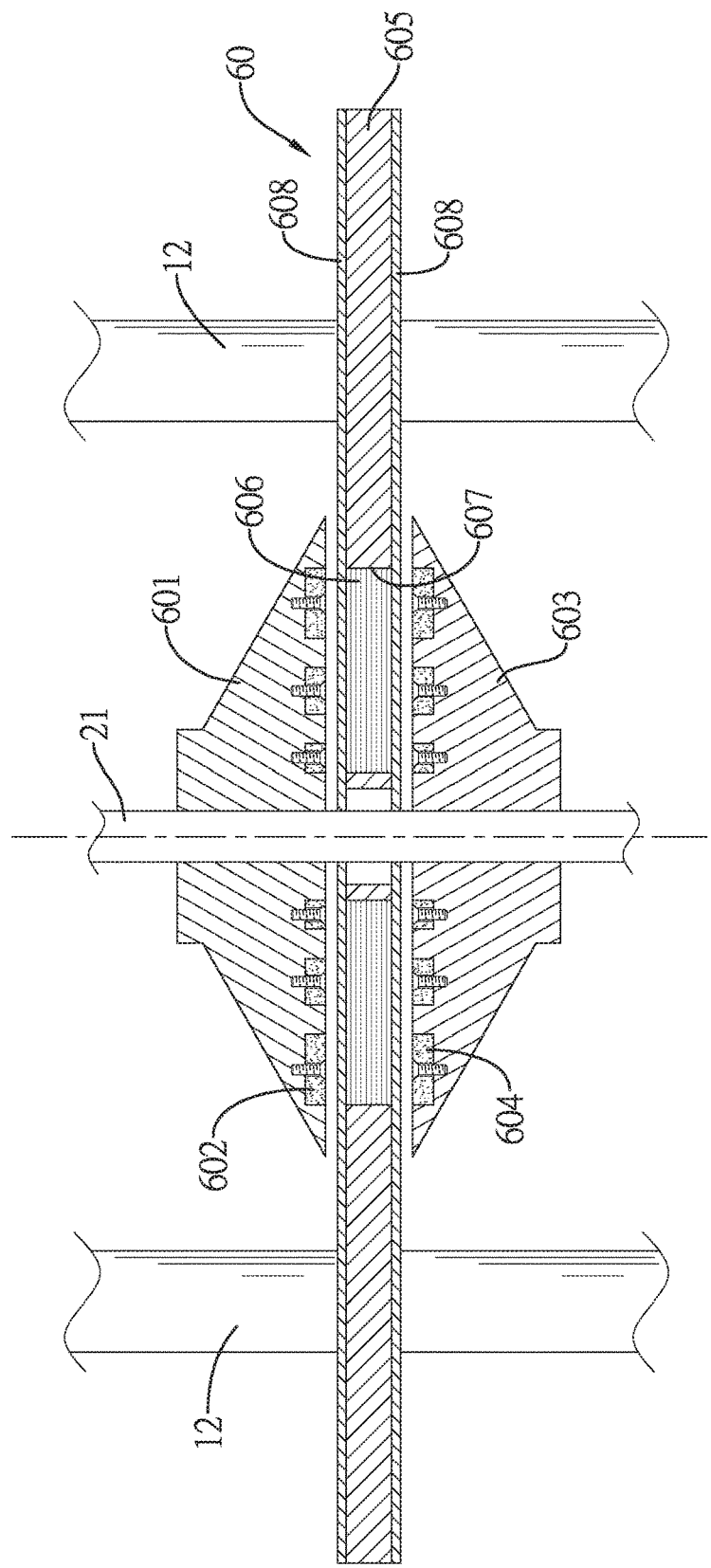
FIG. 9 is a cross-sectional view of an embodiment of an auxiliary motor of the power generation apparatus in FIG. 8.

It is worth mentioning that the primary power generator 50 and the auxiliary power generator 60 are both for converting kinematic energy into electrical energy. As illustrated in FIG. 7, the auxiliary power generator 60 structurally differs from the primary power generator 50 only in difference of the radial width. As such, the example of the auxiliary power generator 60 is taken for structural description, and the structure of the primary power generator 50 is basically similar to that of the auxiliary power generator 60. With reference to FIG. 9, the auxiliary power generator 60 includes an upper rotating member 601, multiple upper permanent magnets 602, a lower rotating member 603, multiple lower permanent magnets 604, at least one fixing board 605 and multiple windings 606.

Figure 10:
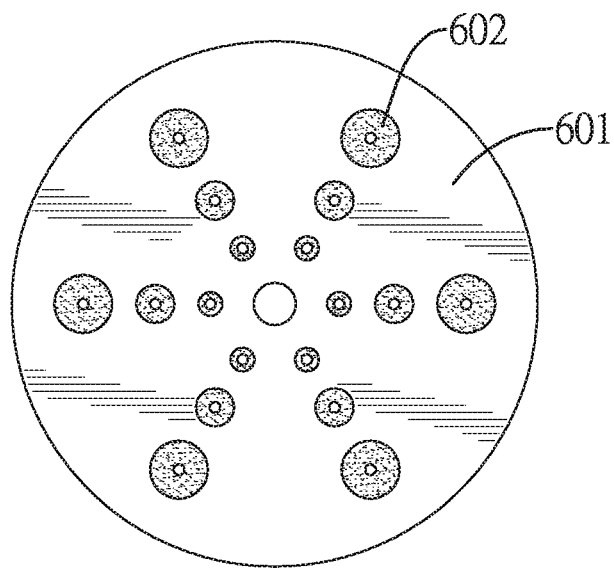
FIG. 10 is a bottom view of an embodiment of an upper rotating member and upper permanent magnets in the upper rotating member of a primary power generator of the power generation apparatus in FIG. 7.

The upper rotating member 601 and the lower rotating member 603 are made of plastic steel, are vertically spaced apart from each other, and are securely mounted around the spindle 21. The upper rotating member 601 and the lower rotating member 603 are rotated along with the spindle 21 to rotate around the center axis 100. The upper rotating member 601 has multiple recesses formed in a bottom surface of the upper rotating member 601 and distributed in rows aligned in multiple radial directions. The multiple upper permanent magnets 604 are mounted inside the respective recesses of the upper rotating member 601. With reference to FIG. 10, an embodiment of the multiple upper permanent magnets 604 mounted on the bottom surface of the upper rotating member 601 for illustration of distribution of the multiple upper permanent magnets 604 on the upper rotating member 601 is shown. Bottom surfaces of the multiple upper permanent magnets 602 are flush with the bottom surface of the upper rotating member 601. The multiple upper permanent magnets 602 are fastened inside the respective recesses of the upper rotating member 601 by bolts and may be cylindrical magnets. The diameters of the upper permanent magnets 602 in each row of the multiple upper permanent magnets 602 progressively increase in a radial direction from a center to a rim of the upper rotating member 601.

The multiple lower permanent magnets 604 are mounted on a top surface of the lower rotating member 603 and are identical to the multiple upper permanent magnets 602 in terms of shape and distribution of magnets. Similar description is not repeated here. In brief, the multiple lower permanent magnets 604 are distributed in rows aligned in multiple radial directions on the top surface of the lower rotating member 603, top surfaces of the multiple lower permanent magnets 604 are flush with the top surface of the lower rotating member 603, and the diameters of the lower permanent magnets 604 in each row of the multiple lower permanent magnets 604 progressively increase in a radial direction from a center to a rim of the lower rotating member 603.

Figure 11:
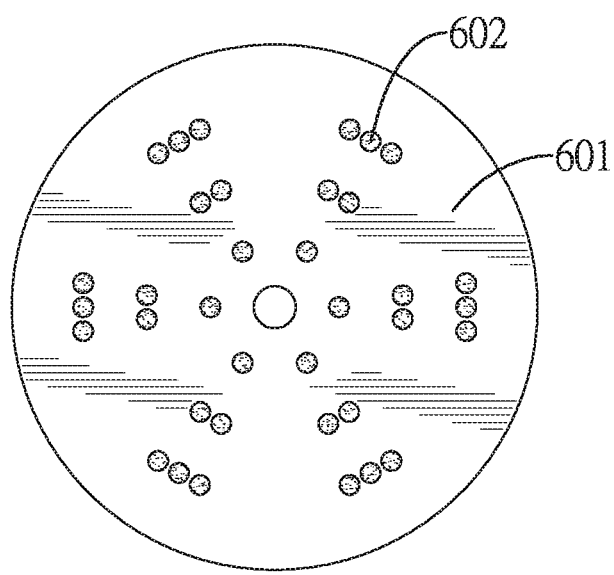
FIG. 11 is a bottom view of another embodiment of an upper rotating member and upper permanent magnets in the upper rotating member of a primary power generator of the power generation apparatus in FIG. 7.

With reference to FIG. 11, another embodiment of the multiple upper permanent magnets 604 mounted on the bottom surface of the upper rotating member 601 for illustration of distribution of the multiple upper permanent magnets 604 on the upper rotating member 601 is shown. The multiple upper permanent magnets 602 are distributed in rows aligned in multiple radial directions on the upper rotating member 601. The diameters of the multiple upper permanent magnets 602 are identical. The upper permanent magnets 602 in each row take the form of multiple clusters aligned in a radial direction, and the upper permanent magnets 602 of the clusters in each row of the multiple upper permanent magnets 602 progressively increase in number in a radial direction from the center to the rim of the upper rotating member 601. The clusters of the upper permanent magnets 602 in each row of the multiple upper permanent magnets 602 are distributed in the form of a sector. Likewise, the multiple lower permanent magnets 604 are distributed in rows aligned in multiple radial directions on the lower rotating member 603. The diameters of the multiple lower permanent magnets 604 are identical. The lower permanent magnets 604 in each row take the form of multiple clusters aligned in a radial direction, and the lower permanent magnets 604 of the clusters in each row of the multiple lower permanent magnets 604 progressively increase in number in a radial direction from the center to the rim of the lower rotating member 603. The clusters of the lower permanent magnets 604 in each row of the multiple lower permanent magnets 604 are distributed in the form of a sector.

In one example, the magnetic pole of upper portions of each upper permanent magnet 602 and each lower permanent magnet 604 may be the magnetic north N pole, and the magnetic pole of lower portions of each upper permanent magnet 602 and each lower permanent magnet 604 may be the magnetic south S pole. In another example, the magnetic pole of upper portions of each upper permanent magnet 602 and each lower permanent magnet 604 may be the magnetic south S pole, and the magnetic pole of lower portions of each upper permanent magnet 602 and each lower permanent magnet 604 may be the magnetic north N pole.

Figure 12:
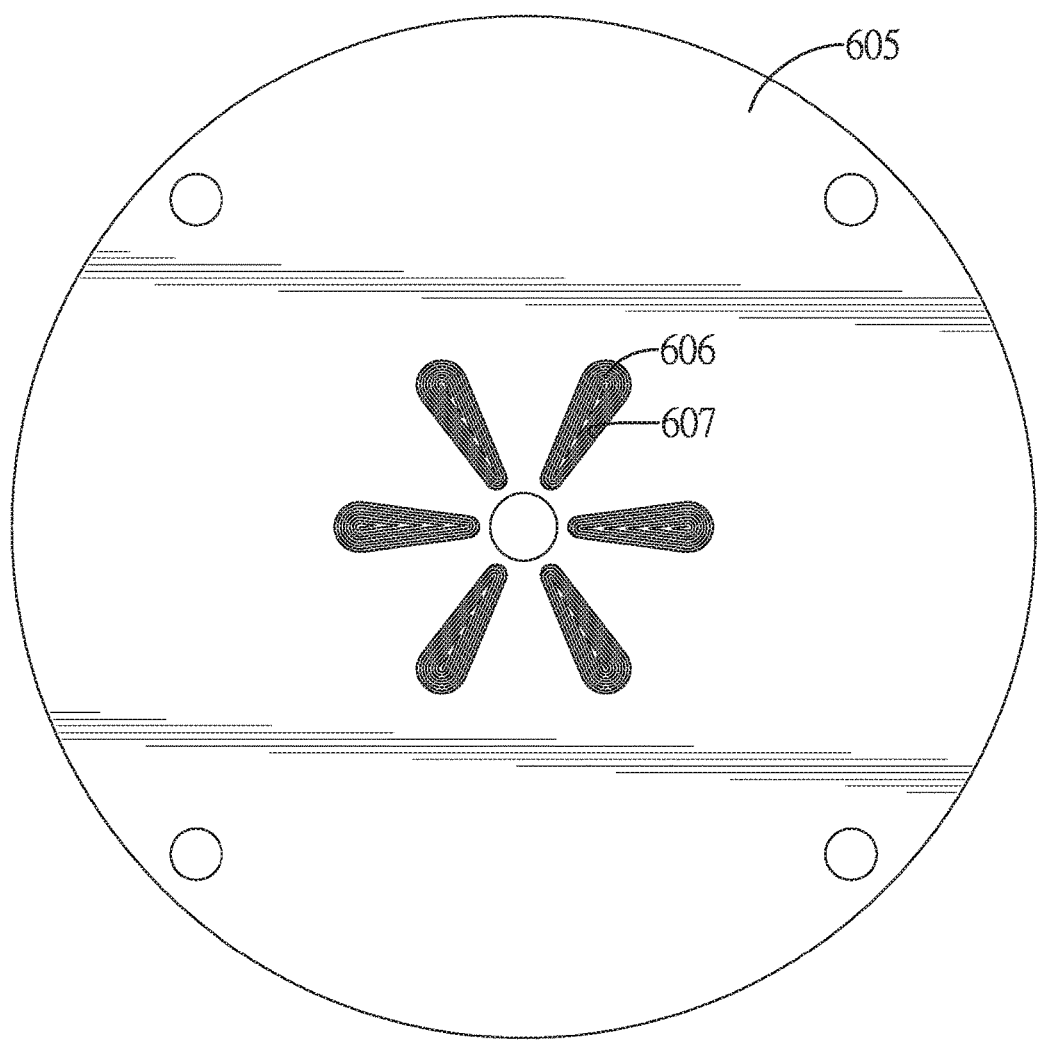
FIG. 12 is a bottom view of a fixing board and windings of the primary power generator in FIG. 7.

With reference to FIGS. 9 and 12, there is one fixing board 605, and the fixing board 605 is securely mounted to the multiple struts 12 and is located between the upper rotating member 601 and the lower rotating member 603. In FIG. 9, the fixing board 605 is located between the bottom surface of the upper rotating member 601 and the top surface of the lower rotating member 603 and has multiple slots 607 formed through the fixing board 605 and aligned radially. The multiple windings 606 are securely mounted inside the respective slots 607 by tight-fit. A center line wound around by each winding 606 is parallel to the center axis 100. An area distributed by each winding 606 covers the upper permanent magnets 602 in a corresponding row of the multiple upper permanent magnets 602 and the lower permanent magnets 604 in a corresponding row of the multiple lower permanent magnets 604. A retaining member 608 may be mounted on each of a top surface and a bottom surface of the fixing board 605 to cover the multiple slots 607, thereby preventing the multiple windings 606 from falling off the respective slots 607.

Figure 13:
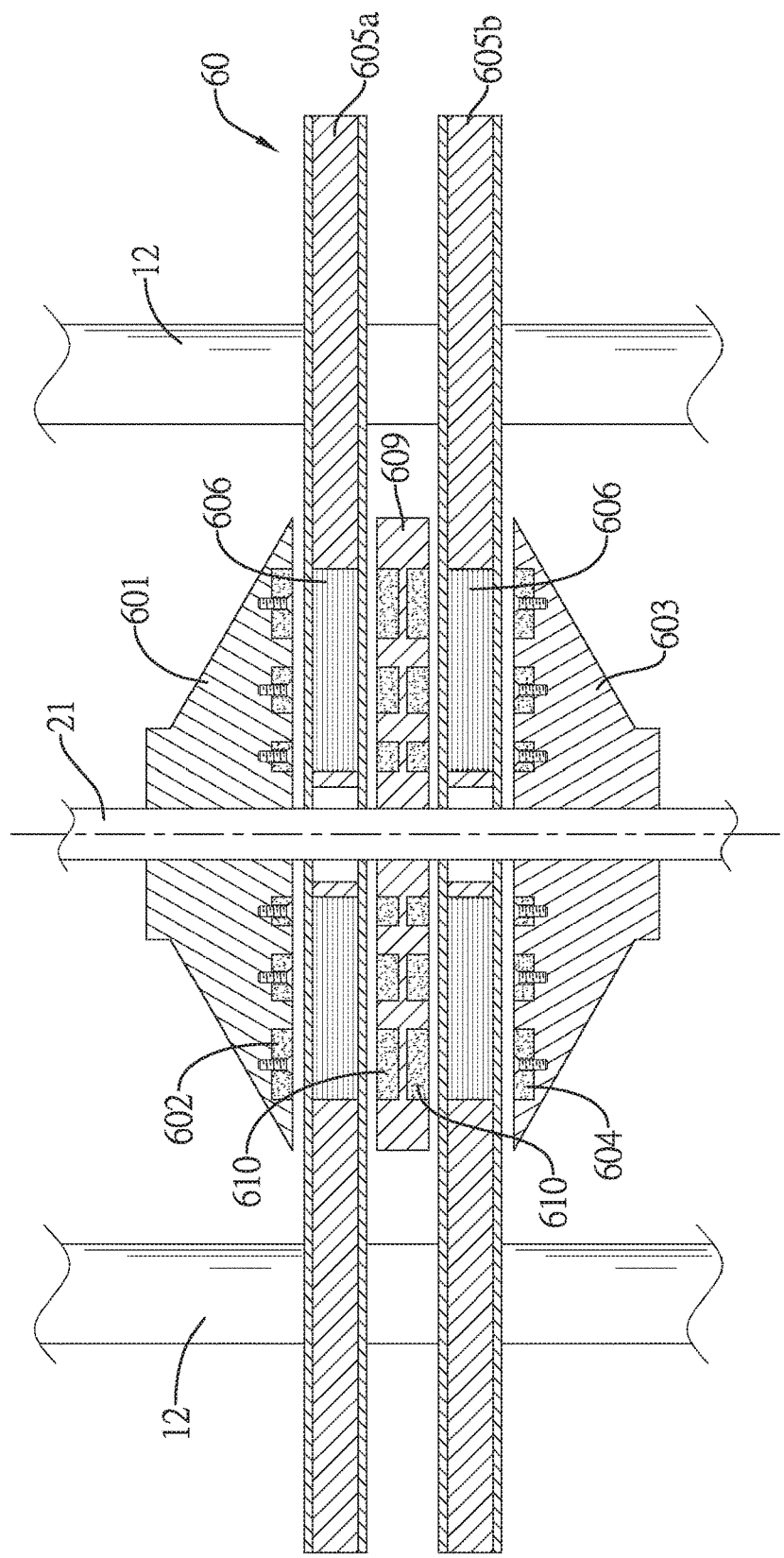
FIG. 13 is a cross-sectional view of another embodiment of an auxiliary power generator of the power generation apparatus in FIG. 7.

With reference to FIG. 13, another embodiment for the primary power generator 50 and the auxiliary power generator 60 is shown. The auxiliary power generator 60 is described as an example from which the primary power generator 50 can be inferred. The auxiliary power generator 60 further includes a middle rotating member 609 and multiple middle permanent magnets 610. There are two fixing boards, namely, a first fixing board 605a and a second fixing board 605b, securely mounted to the multiple struts 12. The upper rotating member 601, the first fixing board 605a, the middle rotating member 609, the second fixing board 605b, and the lower rotating member 603 are sequentially mounted around the spindle 21 in a downward direction. The first fixing board 605a and the second fixing board 605b are structurally similar to the fixing board 605 as shown in FIG. 9. In other words, the multiple windings 606 are mounted inside the first fixing board 605a and the second fixing board 605b. Hence, detailed structures of the first fixing board 605a and the second fixing board 605b are not elaborated here.

The multiple middle permanent magnets 610 are mounted on a top surface and a bottom surface of the middle rotating member 609 and can be distributed as the ways of the multiple upper permanent magnets 602 distributed in FIGS. 10 and 11. Each of the top surface and the bottom surface of the middle rotating member 609 has multiple recesses formed therein. The multiple middle permanent magnets 610 are respectively mounted inside the recesses on the top surface and the bottom surface of the middle rotating member 609. Top surfaces of the middle permanent magnets 610 are flush with the top surface of the middle rotating member 609. Bottom surfaces of the middle permanent magnets 610 are flush with the bottom surface of the middle rotating member 609. The middle permanent magnets 610 on the bottom surface of the middle rotating member 609 and the middle permanent magnets 610 on the top surface of the middle rotating member 609 are securely mounted by way of magnetic attraction of the multiple middle permanent magnets 610.

In an example, the magnetic pole of upper portions of each upper permanent magnet 602, each middle permanent magnet 610 and each lower permanent magnet 604 may be the magnetic north N pole, and the magnetic pole of lower portions of each upper permanent magnet 602, each middle permanent magnet 610 and each lower permanent magnet 604 may be the magnetic south S pole. In another example, the magnetic pole of upper portions of each upper permanent magnet 602, each middle permanent magnet 610 and each lower permanent magnet 604 may be the magnetic south S pole, and the magnetic pole of lower portions of each upper permanent magnet 602, each middle permanent magnet 610 and each lower permanent magnet 604 may be the magnetic north N pole.

With further reference to FIGS. 1 and 7, when the power generation apparatus is operated, the motor 40 outputs rotational kinematic energy to the transmission mechanism 20, meaning that the magnetic field generated by a winding 43 inside the motor 40 drive the rotor 42 and the transmission mechanism 20 to rotate. As being subject to the magnetic force exerted by the multiple magnetic drive assemblies 30, the transmission mechanism 20 is mounted so it is vertically suspended inside the support frame 10 and is rotated around the center axis 100 of the support frame 10. To lower resistance when the transmission mechanism 20 is rotated, the power generation apparatus can be mounted in a vacuum environment. When the included angle between the center axis 100 and each of a peripheral surface of the lower driven portion 222 of the transmission mechanism 20 and the included angle between the inner wall of each of the first magnetic drive member 31 and the second magnetic drive member 32 facing the corresponding magnetic driven member 22 and the center axis 100 is less than 45°, the transmission mechanism 20 is subject to a greater magnetic force in an upward direction, which is appropriate to the transmission mechanism 20 with a heavier weight and operation requiring that the transmission mechanism 20 is operated at a slower speed. On the other hand, when the included angle between the center axis 100 and each of a peripheral surface of the lower driven portion 222 of the transmission mechanism 20 and the included angle between the inner wall of each of the first magnetic drive member 31 and the second magnetic drive member 32 facing the corresponding magnetic driven member 22 and the center axis 100 are more than 45°, the transmission mechanism 20 is subject to a greater magnetic force in a radial direction, which is appropriate to the transmission mechanism 20 with a lighter weight and operation requiring that the transmission mechanism 20 is operated at a faster speed.

When an upper rotating member 501, a lower rotating member 503 or a middle rotating member (not shown) of the primary power generator 50 are driven and rotated to store electrical energy, the motor 40 stops outputting rotational kinematic energy until the transmission mechanism 20 and the primary power generator 50 reach a specific rotation speed. The transmission mechanism 20 and the primary power generator 50 mounted to a bottom end of the transmission mechanism 20 can be still rotated by rotational inertia. In view of no friction loss between the support frame 10 and the transmission mechanism 20, the transmission mechanism 20 can be driven by a higher torque or at a higher rotation speed. With the tapering structure in the upper rotating member 501 and the lower rotating member 503 of the primary power generator 50, the upper rotating member 601 and the lower rotating member 603 of the auxiliary power generator 60, and the rotor 42 of the motor 40, the transmission mechanism 20 as a whole can be firmly rotated.

As shown in FIGS. 1 and 7, when the transmission mechanism 20 is rotated, multiple upper permanent magnets 502 and multiple lower permanent magnets 504 are moved relative to multiple windings 506, such that the multiple windings 506 cut through the magnetic lines of flux of the magnetic field to induce electric potential for power generation.

In sum, when the power generation apparatus in accordance with the present invention is operated, the motor 40 is used to drive the transmission mechanism 20 and the primary power generator 50 securely mounted to the bottom end of the transmission mechanism 20 to rotate for storing the generated electrical energy. As the multiple magnetic drive assemblies 30 apply an upward force of magnetic repulsion to the transmission mechanism 20, the weight of the rotational portions of the primary power generator 50 and the motor 40 (alternatively further including the auxiliary power generator 60) can be offset. Moreover, since there is no friction between the rotating transmission mechanism 20 and the multiple magnetic drive assemblies 30, the rotor 42 of the motor 40 and the primary power generator 50 can be effectively enhanced with faster rotation speed to increase the induced current generated by the windings 506, 606 of the primary power generator 50 and the auxiliary power generator 60. Thus, energy loss during the course of energy transmission can be reduced to achieve the energy-saving goal.

The motor 40 stops outputting rotational kinematic energy until the transmission mechanism 20 and the primary power generator 50 mounted to the bottom end of the transmission mechanism 20 reach a specific rotation speed, while the transmission mechanism 20 and the primary motor 50 can be still rotated by rotational inertia to continuously convert rotational kinematic energy into electrical energy for attaining the excellent effectiveness of power generation.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A vertically mounted and magnetically driven power generation apparatus with weight-free and energy-saving effect, comprising:
    a magnetically driven transmission assembly having:
        a support frame having:
            multiple shelves vertically arranged and vertically spaced apart from each other, each shelf having a through hole formed through the shelf and tapering downwards;
            multiple struts securely connected with the multiple shelves; and
            a center axis vertically and centrally passing through the support frame and the through holes of the multiple shelves;
        a transmission mechanism having:
            a spindle vertically mounted through the support frame along the center axis; and
            multiple magnetic driven members securely mounted around the spindle and located within the through holes of the respective shelves, each magnetic driven member being a permanent magnet and having:
                an upper driven portion being a truncated cone tapering upwards, wherein a top of the upper driven portion extends beyond a top surface of a corresponding shelf through a top opening of the through hole of the corresponding shelf;
                a lower driven portion with a top connected with a bottom of the upper driven portion, being a truncated cone tapering downwards, having a shape symmetrical to that of the upper driven portion, having a magnetic pole different from that of the upper driven portion, and mounted inside the through hole of the corresponding shelf; and
                a ridge line formed on a junction between the upper driven portion and the lower driven portion and taking the form of a circle;
            multiple magnetic drive assemblies mounted on inner walls of the through holes of the respective shelves, each magnetic drive assembly having:
                a first magnetic drive member mounted on the inner wall of the through hole of a corresponding shelf; and
                a second magnetic drive member with a top connected with a bottom of the first magnetic drive member, mounted on the inner wall of the through hole of the corresponding shelf, wherein the first magnetic drive member and the second magnetic drive member are adjacent to but have no contact with the lower driven portion of a corresponding magnetic driven member by way of mutual magnetic repulsion for the transmission mechanism to be vertically and suspendedly mounted through the support frame and the multiple magnetic drive assemblies;
    a primary power generator located at a lower portion of the support frame of the magnetically driven transmission assembly and having:
        an upper rotating member securely mounted around the spindle;
        multiple upper permanent magnets mounted on a bottom surface of the upper rotating member and distributed in rows aligned in multiple radial directions on the upper rotating member, wherein bottom surfaces of the multiple upper permanent magnets are flush with the bottom surface of the upper rotating member;
        a lower rotating member securely mounted around the spindle and vertically spaced apart from the upper rotating member;
        multiple lower permanent magnets mounted on a top surface of the lower rotating member and distributed in rows aligned in multiple radial directions on the lower rotating member, wherein top surfaces of the multiple lower permanent magnets are flush with the top surface of the lower rotating member;
at least one fixing board securely mounted to the multiple struts, located between the upper rotating member and the lower rotating member, and having multiple slots formed through the at least one fixing board, aligned radially, and progressively increasing in diameter in a radial direction from a center to a rim of the upper rotating member; and
multiple windings mounted inside the multiple slots of the at least one fixing board; and
a motor mounted above and separated from the primary power generator, and having:
a stator securely mounted to the multiple struts; and
a rotor mounted around the spindle and located within the stator.

2. The power generation apparatus as claimed in claim 1, wherein the multiple magnetic driven members include two magnetic driven members, one of the two magnetic driven members, the motor, the other magnetic driven member and the primary power generator are sequentially mounted around the spindle in a downward direction, and a radial width of the primary power generator is greater than that of the motor.

3. The power generation apparatus as claimed in claim 1, further comprising an auxiliary power generator, wherein the auxiliary power generator is mounted above the motor and has:
an upper rotating member mounted around the spindle;
multiple upper permanent magnets mounted on a bottom surface of the upper rotating member and distributed in rows aligned in multiple radial directions, wherein bottom surfaces of the multiple upper permanent magnets are flush with the bottom surface of the upper rotating member;
a lower rotating member mounted around the spindle and vertically spaced apart from the upper rotating member;
multiple lower permanent magnets mounted on a top surface of the lower rotating member and distributed in rows aligned in multiple radial directions on the lower rotating member, wherein top surfaces of the multiple lower permanent magnets are flush with the top surface of the lower rotating member;
at least one fixing board securely mounted to the multiple struts, located between the upper rotating member and the lower rotating member, and having multiple slots formed through the at least one fixing board, aligned radially, and progressively increasing in diameter in a radial direction from a center to a rim of the upper rotating member; and
multiple windings mounted inside the multiple slots of the at least one fixing board.

4. The power generation apparatus as claimed in claim 3, wherein the multiple magnetic driven members include three magnetic driven members, a first one of the three magnetic driven members, the auxiliary power generator, a second one of the three magnetic driven members, the motor, a third one of the three magnetic driven members, and the primary power generator are sequentially mounted around the spindle in a downward direction, a radial width of the primary power generator is greater than that of the motor, and a radial width of the motor is greater than that of the auxiliary power generator.

5. The power generation apparatus as claimed in claim 2, wherein in the primary power generator the diameters of the upper permanent magnets in each row of the multiple upper permanent magnets progressively increase in a radial direction from a center to a rim of the upper rotating member, and the diameters of the lower permanent magnets in each row of the multiple lower permanent magnets progressively increase in a radial direction from a center to a rim of the lower rotating member.

6. The power generation apparatus as claimed in claim 4, wherein in the primary power generator the diameters of the upper permanent magnets in each row of the multiple upper permanent magnets progressively increase in a radial direction from a center to a rim of the upper rotating member, and the diameters of the lower permanent magnets in each row of the multiple lower permanent magnets progressively increase in a radial direction from a center to a rim of the lower rotating member.

7. The power generation apparatus as claimed in claim 2, wherein
in the primary power generator the diameters of the multiple upper permanent magnets are equal, the upper permanent magnets in each row take the form of multiple clusters aligned in a radial direction, and the upper permanent magnets of the clusters in each row of the multiple upper permanent magnets progressively increase in number in a radial direction from the center to the rim of the upper rotating member, and the clusters of the upper permanent magnets in each row of the multiple upper permanent magnets are distributed in the form of a sector; and
in the primary power generator the diameters of the multiple lower permanent magnets are equal, the lower permanent magnets in each row take the form of multiple clusters aligned in a radial direction, and the lower permanent magnets of the clusters in each row of the multiple lower permanent magnets progressively increase in number in a radial direction from the center to the rim of the lower rotating member.

8. The power generation apparatus as claimed in claim 4, wherein
in the primary power generator the diameters of the multiple upper permanent magnets are equal, the upper permanent magnets in each row take the form of multiple clusters aligned in a radial direction, and the upper permanent magnets of the clusters in each row of the multiple upper permanent magnets progressively increase in number in a radial direction from the center to the rim of the upper rotating member, and the clusters of the upper permanent magnets in each row of the multiple upper permanent magnets are distributed in the form of a sector; and
in the primary power generator the diameters of the multiple lower permanent magnets are equal, the lower permanent magnets in each row take the form of multiple clusters aligned in a radial direction, and the lower permanent magnets of the clusters in each row of the multiple lower permanent magnets progressively increase in number in a radial direction from the center to the rim of the lower rotating member.

9. The power generation apparatus as claimed in claim 2, wherein
the primary power generator has:
a middle rotating member; and
multiple middle permanent magnets located between the upper rotating member and the lower rotating member, and mounted on a top surface and a bottom surface of the middle rotating member;
the at least one fixing board of the primary power generator includes a first fixing board and a second fixing board; and the upper rotating member, the first fixing board, the middle rotating member, the second fixing board, and the lower rotating member are sequentially mounted around the spindle in a downward direction, and the multiple windings are mounted inside the first fixing board and the second fixing board.

10. The power generation apparatus as claimed in claim 4, wherein
the primary power generator has:
a middle rotating member; and
multiple middle permanent magnets located between the upper rotating member and the lower rotating member, and mounted on a top surface and a bottom surface of the middle rotating member;
the at least one fixing board of the primary power generator includes a first fixing board and a second fixing board; and
the upper rotating member, the first fixing board, the middle rotating member, the second fixing board, and the lower rotating member are sequentially mounted around the spindle in a downward direction, and the multiple windings are mounted inside the first fixing board and the second fixing board.

11. The power generation apparatus as claimed in claim 2, wherein
each first magnetic drive member is a permanent magnet taking the form of a conic ring, an inner wall of the first magnetic drive member facing a corresponding magnetic driven member is parallel to a peripheral surface of the lower driven portion of the corresponding magnetic driven member, an outer periphery of the first magnetic drive member is mounted on an upper portion of the inner wall of a corresponding through hole, each first magnetic drive member includes an upper pole portion and a lower pole portion, and the upper pole portion and the lower pole portion are integrally formed and annularly mounted on the inner wall of the through hole to face a corresponding magnetic driven member; and
each second magnetic drive member has multiple elongated permanent magnet plates annularly mounted on the inner wall of the through hole of a corresponding shelf, two edges of each adjacent two of the multiple elongated permanent magnet plates adjoin each other, the multiple elongated permanent magnet plates are arranged in the form of a truncated pyramid shell, each elongated permanent magnet plate has an inner surface facing a corresponding magnetic driven member, the inner surfaces of the multiple elongated permanent magnet plates facing the corresponding magnetic driven member are parallel to the peripheral surface of the lower driven portion of the corresponding magnetic driven member, and each elongated permanent magnet plate of the second magnetic drive member has an inner pole portion proximate to the center axis and an outer pole portion distal to the center axis.

12. The power generation apparatus as claimed in claim 4, wherein
each first magnetic drive member is a permanent magnet taking the form of a conic ring, an inner wall of the first magnetic drive member facing a corresponding magnetic driven member is parallel to a peripheral surface of the lower driven portion of the corresponding magnetic driven member, an outer periphery of the first magnetic drive member is mounted on an upper portion of the inner wall of a corresponding through hole, each first magnetic drive member includes an upper pole portion and a lower pole portion, and the upper pole portion and the lower pole portion are integrally formed and annularly mounted on the inner wall of the through hole to face a corresponding magnetic driven member; and
each second magnetic drive member has multiple elongated permanent magnet plates annularly mounted on the inner wall of the through hole of a corresponding shelf, two edges of each adjacent two of the multiple elongated permanent magnet plates adjoin each other, the multiple elongated permanent magnet plates are arranged in the form of a truncated pyramid shell, each elongated permanent magnet plate has an inner surface facing a corresponding magnetic driven member, the inner surfaces of the multiple elongated permanent magnet plates facing the corresponding magnetic driven member are parallel to the peripheral surface of the lower driven portion of the corresponding magnetic driven member, and each elongated permanent magnet plate of the second magnetic drive member has an inner pole portion proximate to the center axis and an outer pole portion distal to the center axis.

13. The power generation apparatus as claimed in claim 11, wherein
the ridge line of each magnetic driven member is aligned with a junction between the upper pole portion and the lower pole portion of a corresponding first magnetic drive member, and a bottom of the lower driven portion of each magnetic driven member is aligned with a central portion of the second magnetic drive member.

14. The power generation apparatus as claimed in claim 12, wherein
the ridge line of each magnetic driven member is aligned with a junction between the upper pole portion and the lower pole portion of a corresponding first magnetic drive member, and a bottom of the lower driven portion of each magnetic driven member is aligned with a central portion of the second magnetic drive member.

15. The power generation apparatus as claimed in claim 2, wherein the rotor has a top block, a middle block and a bottom block integrally formed, the top block is formed on a top surface of the middle block and tapers upwards, the bottom block is formed on a bottom surface of the middle block and tapers downwards, the middle block is a cylindrical block, and the diameters of a bottom surface of the top block, a top surface of the bottom block, and the middle block are equal.

16. The power generation apparatus as claimed in claim 4, wherein the rotor has a top block, a middle block and a bottom block integrally formed, the top block is formed on a top surface of the middle block and tapers upwards, the bottom block is formed on a bottom surface of the middle block and tapers downwards, the middle block is a cylindrical block, and the diameters of a bottom surface of the top block, a top surface of the bottom block, and the middle block are equal.

* * * * *